(12) United States Patent
Yamada et al.

(10) Patent No.: US 9,293,791 B2
(45) Date of Patent: *Mar. 22, 2016

(54) ZINC SECONDARY BATTERY

(71) Applicant: NGK INSULATORS, LTD., Nagoya-Shi (JP)

(72) Inventors: Naohito Yamada, Nagoya (JP); Kazuhiro Yamamoto, Nagoya (JP); Takahiro Tomita, Nagoya (JP); Haruo Otsuka, Nagoya (JP)

(73) Assignee: NGK Insulators, Ltd., Nagoya-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/323,133

(22) Filed: Jul. 3, 2014

(65) Prior Publication Data

US 2014/0315099 A1    Oct. 23, 2014

Related U.S. Application Data

(63) Continuation of application No. PCT/JP2013/050904, filed on Jan. 18, 2013.

(30) Foreign Application Priority Data

Feb. 6, 2012    (JP) .................................. 2012-023377

(51) Int. Cl.
| | | |
|---|---|---|
| *H01M 10/26* | (2006.01) | |
| *H01M 2/14* | (2006.01) | |
| *H01M 2/16* | (2006.01) | |
| *H01M 10/24* | (2006.01) | |
| *H01M 10/30* | (2006.01) | |
| *H01M 10/32* | (2006.01) | |
| *H01M 12/08* | (2006.01) | |

(Continued)

(52) U.S. Cl.
CPC ............ *H01M 10/26* (2013.01); *H01M 2/1646* (2013.01); *H01M 4/244* (2013.01);

(Continued)

(58) Field of Classification Search
USPC ................. 429/129–147, 247–255, 188, 189, 429/301–347, 199–207
See application file for complete search history.

(56) References Cited

U.S. PATENT DOCUMENTS

| | | | | |
|---|---|---|---|---|
| 2013/0143132 | A1* | 6/2013 | Mizuno | ........................ 429/405 |
| 2013/0273442 | A1* | 10/2013 | Ogumi | ................ H01M 4/9016 |
| | | | | 429/405 |

FOREIGN PATENT DOCUMENTS

| | | |
|---|---|---|
| EP | 2 750 225 A1 | 7/2014 |
| EP | 2 782 185 A1 | 9/2014 |

(Continued)

OTHER PUBLICATIONS

European Search Report, European Application No. 13746835.1, dated Oct. 6, 2015 (7 pages).

(Continued)

*Primary Examiner* — Basia Ridley
*Assistant Examiner* — Caitlin Wilmot
(74) *Attorney, Agent, or Firm* — Burr & Brown, PLLC

(57) ABSTRACT

Provide is a zinc secondary battery capable of preventing a short circuit between the positive and negative electrodes caused by zinc dendrites. The zinc secondary battery of the present invention comprises a positive electrode; a negative electrode containing zinc; an electrolytic solution in which the positive electrode and the negative electrode are immersed or with which the positive electrode and the negative electrode are in contact, wherein the electrolytic solution is an aqueous solution containing an alkali metal hydroxide; and a separator being placed between the positive electrode and the negative electrode and separating the positive electrode and the negative electrode from each other, wherein the separator comprises an inorganic solid electrolyte body having hydroxide ion conductivity.

10 Claims, 1 Drawing Sheet

(51) Int. Cl.
*H01M 4/24* (2006.01)
*H01M 4/32* (2006.01)

(52) U.S. Cl.
CPC ............ *H01M 10/24* (2013.01); *H01M 10/30* (2013.01); *H01M 10/32* (2013.01); *H01M 12/08* (2013.01); *H01M 4/32* (2013.01); *H01M 2300/0014* (2013.01); *H01M 2300/0065* (2013.01); *H01M 2300/0091* (2013.01); *Y02E 60/124* (2013.01)

(56) References Cited

FOREIGN PATENT DOCUMENTS

| JP | 06-196199 A | 7/1994 |
|---|---|---|
| JP | 11-054 103 A | 2/1999 |
| JP | 11-054103 A | 2/1999 |
| JP | 2007-227032 A | 9/2007 |
| WO | 2006/116496 A2 | 11/2006 |
| WO | 2010/109670 A1 | 9/2010 |
| WO | 2012/056301 A1 | 5/2012 |

OTHER PUBLICATIONS

Inoue, Hiroshi et al. "Inorganic Hydrogel Electrolyte with Liquidlike Ionic Conductivity," *Electrochemical and Solid-State Letters*, vol. 12(3), 2009 (3 pages).

International Search Report and Written Opinion (With English Translation), International Application No. PCT/JP2013/050904, dated Feb. 26, 2013 (9 pages).

International Preliminary Report on Patentability (With English Translation), International Application No. PCT/JP2013/050904, dated Aug. 12, 2014 (9 pages).

\* cited by examiner

ZINC SECONDARY BATTERY

CROSS-REFERENCE TO RELATED APPLICATIONS

This application is a continuation application of PCT/JP2013/050904 filed Jan. 18, 2013, which claims priority to Japanese Patent Application No. 2012-23377 filed Feb. 6, 2012, the entire contents all of which are incorporated herein by reference.

BACKGROUND OF THE INVENTION

1. Field of the Invention

The present invention relates to zinc secondary batteries such as nickel-zinc secondary batteries, silver oxide-zinc secondary batteries, manganese oxide-zinc secondary batteries, zinc-air secondary batteries, and other alkaline zinc secondary batteries.

2. Description of the Related Art

Development and examination of nickel-zinc secondary batteries have been carried out for many years, but nickel-zinc secondary batteries are not yet in practical use. This is due to the problem in that zinc, which constitutes the negative electrode, generates tree-like crystals called dendrites during charging, and dendrites break through the separator, thus resulting in a short circuit with the positive electrode. On the other hand, nickel-cadmium batteries and nickel-metal hydride batteries are already commercially available. However, nickel-zinc secondary batteries are advantageous in that they have an extremely high theoretical capacity density about 5 times that of nickel-cadmium secondary batteries, 2.5 times that of nickel-metal hydride secondary batteries, and 1.3 times that of lithium-ion batteries, and also material prices of nickel-zinc secondary batteries are low. Therefore, a technique for preventing a short circuit caused by zinc dendrites in nickel-zinc secondary batteries is strongly desired.

Patent Document 1 (JP H6-196199A) proposes suppression of dendrites by a separator in a nickel-zinc battery. In this document, a microporous, multi-layered metal oxide layer provided on a resin separator allows ions that are involved in a battery reaction to penetrate the separator, but makes it difficult for the metal that has undergone dendritic growth to penetrate the separator. It is disclosed that the material of the multi-layer metal oxide is one or more selected from alumina, titanium oxide, silica, cerium oxide, zirconium oxide, magnesium oxide, chromium oxide, calcium oxide, tin oxide, indium oxide, and germanium oxide.

Patent Document 2 (JP H11-054103A) discloses enhancement of dendrite resistance by reducing the rate of dendrite growth by a porous membrane separator in which a partially-saponified crosslinked polyvinyl alcohol membrane is impregnated with glycerin.

Patent Document 3 (JP 2008-539559A) discloses a separator having a barrier layer that suppresses dendrite formation and a wetting layer that retains electrolytes. According to this document, it is desirable that the separator has a structure with small pores, and it is preferable that the separator has a laminate structure with two or more layers. Such structures provide a tortuous path for zinc dendrites and thus suppress a short circuit caused by dendrites.

Meanwhile, recently, a layered double hydroxide (LDH) represented by the general formula $M^{2+}_{1-x}M^{3+}_{x}(OH)_2 A^{n-}_{x/n} \cdot mH_2O$ (wherein $M^{2+}$ is a divalent cation, $M^{3+}$ is a trivalent cation, and $A^{n-}$ is an anion having a valency of n) is known as a hydroxide ion-conductive solid electrolyte, and it is proposed that a membrane of such a layered double hydroxide is used as an alkaline electrolyte membrane for a direct alcohol fuel battery (see, for example, Patent Document 4 (WO 2010/109670)).

CITATION LIST

Patent Documents

Patent Document 1: JP H6-196199A
Patent Document 2: JP H11-054103A
Patent Document 3: JP 2008-539559A
Patent Document 4: WO 2010/109670

SUMMARY OF THE INVENTION

The inventors have currently found that an inorganic solid electrolyte body having hydroxide ion conductivity used as a separator in a zinc secondary battery can prevent a short circuit between the positive and negative electrodes caused by zinc dendrites during charging and, as a result, the reliability of the zinc secondary battery can be greatly enhanced.

Accordingly, an object of the present invention is to provide a zinc secondary battery capable of preventing a short circuit between the positive and negative electrodes caused by zinc dendrites.

According to one aspect of the present invention, there is provided a zinc secondary battery comprising:
  a positive electrode;
  a negative electrode containing zinc;
  an electrolytic solution in which the positive electrode and the negative electrode are immersed or with which the positive electrode and the negative electrode are in contact, wherein the electrolytic solution is an aqueous solution containing an alkali metal hydroxide; and
  a separator being placed between the positive electrode and the negative electrode and separating the positive electrode and the negative electrode from each other, wherein the separator comprises an inorganic solid electrolyte body having hydroxide ion conductivity.

DETAILED DESCRIPTION OF THE INVENTION

Zinc Secondary Battery

The zinc secondary battery of the present invention is not particularly limited as long as it is a secondary battery in which zinc is used as a negative electrode and an aqueous alkali metal hydroxide solution is used as an electrolytic solution. Therefore, the zinc secondary battery of the present invention can be a nickel-zinc secondary battery, a silver oxide-zinc secondary battery, a manganese oxide-zinc secondary battery, a zinc-air secondary battery, or another type of alkaline zinc secondary battery. In particular, a nickel-zinc secondary battery is preferable due to its high theoretical capacity density per weight and low material prices. For example, while the energy density of commercially available silver oxide-zinc primary batteries is 116 Wh/kg and the energy density of commercially available manganese oxide-zinc primary batteries is 160 Wh/kg, the theoretical energy density of nickel-zinc secondary batteries is considerably high at 334 Wh/kg.

Figure 1:
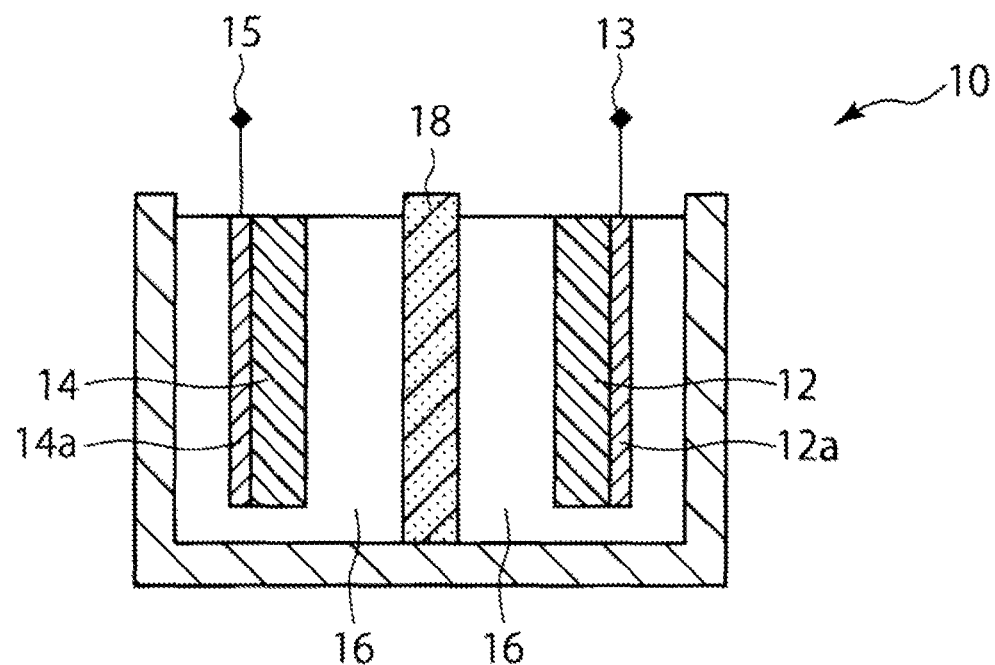
FIG. 1 is a conceptual diagram showing the configuration of a zinc secondary battery according to the present invention.

FIG. 1 conceptually shows a configuration of the zinc secondary battery according to the present invention. A zinc secondary battery 10 shown in FIG. 1 is for a conceptual description of the battery configuration of the present invention, and is generally applicable to the aforementioned various zinc secondary batteries, including nickel-zinc secondary batteries. As shown in FIG. 1, the zinc secondary battery 10 according to the present invention includes a positive electrode 12, a negative electrode 14, an electrolytic solution 16, and a separator 18 inside a battery cell. The negative electrode 14 contains zinc. Zinc may be contained in the negative electrode 14 in any form of zinc metal, zinc compound and zinc alloy as long as electrochemical activity suitable for the negative electrode is exhibited. The positive electrode 12 is suitably selected according to the type of the zinc secondary battery to be used, and for example, the positive electrode 12 can be an electrode which contains nickel oxyhydroxide in the case of a nickel-zinc secondary battery, silver oxide in the case of a silver oxide-zinc secondary battery, manganese dioxide in the case of a manganese oxide-zinc secondary battery, or an air electrode that captures oxygen in air in the case of a zinc-air secondary battery. The electrolytic solution 16 is an alkali metal hydroxide-containing aqueous solution in which the positive electrode 12 and the negative electrode 14 are immersed or with which these electrodes are in contact. The separator 18 comprises an inorganic solid electrolyte body having hydroxide ion conductivity, and is placed between the positive electrode 12 and the negative electrode 14 and separates the positive electrode 12 and the negative electrode 14 from each other. The positive electrode 12 and the electrolytic solution 16 do not need to be separated, and they may be configured as a positive electrode mixture in which a positive electrode and an electrolytic solution are mixed. Similarly, the negative electrode 14 and the electrolytic solution 16 do not need to be separated, and they may be configured as a negative electrode mixture in which a negative electrode and an electrolytic solution are mixed. In any case, the positive electrode 12, the negative electrode 14, and the electrolytic solution 16 may be suitably configured by a known technique according to the type of the zinc secondary battery to be used, and are thus not particularly limited. The positive electrode 12 may be optionally provided with a positive electrode current collector 12a, which may be connected to a positive electrode terminal 13. The negative electrode 14 may be optionally provided with a negative electrode current collector 14a, which may be connected to a negative electrode terminal 15.

In this way, the zinc secondary battery of the present invention has a configuration in which zinc is used as the negative electrode 14 and an aqueous alkali metal hydroxide solution is used as the electrolytic solution 16. An inorganic solid electrolyte body having hydroxide ion conductivity used as the separator 18 separates the electrolytic solution between the positive and negative electrodes and ensures hydroxide ion conductivity. The inorganic solid electrolyte constituting the separator 18 is typically a dense and hard inorganic solid and thus physically inhibits penetration of the separator by zinc dendrites that generate during charging and makes it possible to prevent a short circuit between the positive and negative electrodes. As a result, the reliability of the aforementioned various zinc secondary batteries can be significantly improved.

The separator 18 comprises an inorganic solid electrolyte body having hydroxide ion conductivity, and any material that can function as a separator is usable. The inorganic solid electrolyte is typically composed of a dense and hard inorganic solid and, therefore, can prevent a short circuit between the positive and negative electrodes caused by zinc dendrites. It is preferable that the inorganic solid electrolyte body has a relative density of 90% or greater, more preferably 92% or greater, and further preferably 95% or greater as calculated by the Archimedes method, but as long as the inorganic solid electrolyte body is dense and hard to such an extent that penetration by zinc dendrites is prevented, the relative density is not limited thereto. Such a dense and hard inorganic solid electrolyte body can be produced by a hydrothermal solidifying method. Therefore, a mere green compact that has not undergone hydrothermal solidification is not dense and is brittle in a solution, and is thus not preferable as the inorganic solid electrolyte body of the present invention. As a matter of course, any solidifying method, not just a hydrothermal solidifying method, is usable as long as a dense and hard inorganic solid electrolyte body is obtained.

The separator 18 may be a composite of a group of particles comprising an inorganic solid electrolyte body having hydroxide ion conductivity and an auxiliary component that assists the group of particles to become dense and hard. Alternatively, the separator 18 may be a composite of a porous body with open pores that serves as a substrate and an inorganic solid electrolyte (such as a layered double hydroxide) deposited and grown in the pores so as to block the pores of the porous body. Examples of materials that constitute the porous body include ceramics such as alumina and zirconia, and insulating materials such as porous sheets composed of foamed resins or fibrous materials. It is preferable that the inorganic solid electrolyte body is composed of a layered double hydroxide (LDH) having a basic composition represented by the general formula:

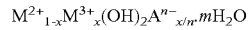

$$M^{2+}_{1-x}M^{3+}_{x}(OH)_2 A^{n-}_{x/n} \cdot mH_2O$$

wherein $M^{2+}$ is at least one divalent cation, $M^{3+}$ is at least one trivalent cation, $A^{n-}$ is an anion having a valency of n, n is an integer of 1 or greater, x is 0.1 to 0.4, and m is any number greater than 0 that indicates the molar number of water. Examples of $M^{2+}$ include $Mg^{2+}$, $Ca^{2+}$, $Sr^{2+}$, $Ni^{2+}$, $Co^{2+}$, $Fe^{2+}$, $Mn^{2+}$, and $Zn^{2+}$, examples of $M^{3+}$ include $Al^{3+}$, $Fe^{3+}$, $Ti^{3+}$, $Y^{3+}$, $Ce^{3+}$, $Mo^{3+}$, and $Cr^{3+}$, and examples of $A^{n-}$ includes $CO_3^{2-}$ and $OH^-$. $M^{2+}$ and $M^{3+}$ each may be composed of a single component or a combination of two or more. In particular, an Mg—Al LDH in which $M^{2+}$ is $Mg^{2+}$, $M^{3+}$ is $Al^{3+}$, and $A^{n-}$ is $CO_3^{2-}$ is preferable. Patent Document 4 (WO2010/109670) discloses that this compound has an $OH^-$ ion conductivity and is used as an alkaline electrolyte membrane for a direct alcohol fuel battery. However, the alkaline electrolyte membrane in Patent Document 4 is merely a membrane obtained by compressing Mg—Al layered double hydroxide powder with a cold press or the like, and bonding of powder particles is not strong. It is understood that such a technique is used because powder of hydroxide, unlike so-called oxide ceramics, cannot be unified and densified by sintering. Also, $M^{3+}$ in the general formula above may be partially or entirely replaced with a cation having a valency of 4 or greater, and in such a case, the coefficient x/n of the anion $A^{n-}$ in the general formula above may be suitably changed.

Thus, in order to attain an inorganic solid electrolyte body usable in the present invention, it is preferable that pellets obtained by compressing base powder are densified by a hydrothermal solidifying method. This technique is extremely effective for unifying and densifying a layered double hydroxide, especially an Mg—Al layered double hydroxide. The hydrothermal solidifying method can be carried out in a pressure vessel in which pure water and a plate-shaped green compact have been placed, at a temperature of 120 to 250° C., preferably 180 to 250° C., for 2 to 24 hours, preferably 3 to 10 hours.

The form of the separator 18 is not particularly limited, and the separator may be in any of dense plate and membrane forms. The separator in a plate form is preferable for enabling effective inhibition of zinc dendrite penetration. A preferable thickness of an inorganic solid electrolyte body in a plate form is 0.01 to 0.5 mm, more preferably 0.02 to 0.2 mm, and even more preferably 0.05 to 0.1 mm. Also, the greater the hydroxide ion conductivity of the inorganic solid electrolyte body, the more desirable it is, and the inorganic solid electrolyte body typically has a conductivity of $10^{-4}$ to $10^{-1}$ S/m.

In order to more stably retain hydroxide ions on the separator 18, a porous substrate may be provided on one surface or both surfaces of the separator 18. In the case of providing a porous substrate on one surface of the separator 18, a technique may be employed in which a porous substrate is provided and a membrane of the inorganic solid electrolyte is formed on this porous substrate. On the other hand, in the case of providing a porous substrate on both surfaces of the separator 18, it is possible that base powder of the inorganic solid electrolyte is sandwiched between two porous substrates, and densification is performed therebetween.

Nickel-Zinc Secondary Battery

A particularly preferable zinc secondary battery is a nickel-zinc secondary battery, and the configuration shown in FIG. 1 is directly applicable to a nickel-zinc battery. Therefore, the configuration of a nickel-zinc battery will now be described below in reference to FIG. 1.

The positive electrode 12 may be a positive electrode containing a nickel hydroxide compound, which is a positive electrode active material, and examples of such compounds include nickel oxyhydroxide, nickel hydroxide, and the like. In particular, nickel oxyhydroxide is more preferable for high battery voltage and large discharge capacity. Battery reactions during discharging when nickel oxyhydroxide is used in the positive electrode 12 are as follows:

Positive electrode: 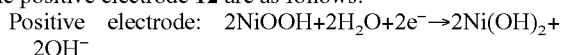
Negative electrode: 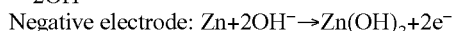
Overall: 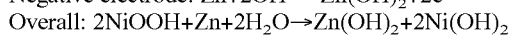

The positive electrode 12 may be configured as a positive electrode mixture by further containing, for example, an electrolytic solution. The positive electrode mixture can contain a positive electrode active material comprising nickel hydroxide compound particles and optionally manganese dioxide particles; optionally an electrically conductive material such as carbon particles; an electrolytic solution; and optionally a binder and the like. It is preferable to obtain the positive electrode mixture by mixing and pressing these components such that the positive electrode mixture is molded in a hollow cylindrical shape, with the outer diameter thereof being nearly identical to the inner diameter of a metal can. In the molded positive electrode mixture, typically, positive electrode active material particles and electrically conductive material particles are bound to each other, and the particle boundary between the particles is filled with an electrolytic solution.

The nickel hydroxide compound itself, which is a positive electrode active material, may be in the form of a eutectic crystal with either zinc or cobalt or with both zinc and cobalt. A preferable amount of zinc or cobalt allowable for eutectic crystal formation with the nickel hydroxide compound is 4 to 12%. Also, a compound of Y, Er, Yb, or Ca may be added to the positive electrode active material nickel hydroxide to improve capacity retention during storage. Examples of such compounds include metal oxides such as $Y_2O_3$, $Er_2O_3$, and $Yb_2O_3$ as well as metal fluorides such as $CaF_2$. These metal oxides and metal fluorides are preferably used in an amount of 0.1 to 10% by mass relative to the positive electrode active material nickel hydroxide. Addition of a metal oxide or a metal fluoride to nickel hydroxide may be carried out by adding metal oxide particles or metal fluoride particles to nickel hydroxide particles dispersed in an aqueous medium.

Manganese dioxide that may be contained in the positive electrode 12 or in the positive electrode mixture may be manganese dioxide particles used in ordinary manganese dry cell batteries, and electrolytic manganese dioxide is preferable. When nickel hydroxide compound particles and manganese dioxide particles are blended and used as a positive electrode active material, the proportion of these components blended, i.e., the mass ratio of nickel hydroxide compound to manganese dioxide, may be suitably determined in consideration of discharge characteristics and discharge capacity, and for example, it is in the range of 60:40 to 40:60.

The positive electrode 12 or the positive electrode mixture may contain carbon particles such as graphite or carbon black, e.g., Ketchen black or acetylene black, for improving electrical conductivity. When carbon particles are contained in the positive electrode mixture, the carbon particle content is preferably 2 to 10% by mass from the viewpoint of discharge capacity, and more preferably 3 to 7% by mass.

The negative electrode 14 contains zinc. Zinc may be contained in any of zinc metal, zinc compound, and zinc alloy forms as long as electrochemical activity suitable for the negative electrode is exhibited. Preferable examples of negative electrode materials include zinc oxide, zinc metal, calcium zincate, and the like, and zinc metal or zinc alloy is more preferable. The negative electrode 14 may be configured in a gel form, or may be mixed with an electrolytic solution to form a negative electrode mixture. For example, a gelated negative electrode can be easily obtained by adding an electrolytic solution and a thickener to a negative electrode active material. Examples of thickeners include polyvinyl alcohol, polyacrylate, CMC, alginic acid, and the like, and polyacrylic acid is preferable due to its excellent chemical resistance to strong alkalis.

For a zinc alloy, it is possible to use a zinc alloy not containing mercury and lead, which is known as a mercury-free zinc alloy. For example, a zinc alloy containing 0.01 to 0.06% by mass of indium, 0.005 to 0.02% by mass of bismuth, and 0.0035 to 0.015% by mass of aluminum has an effect of suppressing hydrogen gas generation, and is thus preferable. In particular, indium and bismuth are advantageous for enhancing discharge performance. The zinc alloy used for the negative electrode can reduce the rate of self-dissolution in an alkaline electrolytic solution and thus suppress hydrogen gas generation to enhance safety.

The form of the negative electrode material is not particularly limited, but the negative electrode material is preferably in a powder form, by which the surface area is increased to be capable of coping with large current discharge. A preferable average particle diameter of the negative electrode material in the case of a zinc alloy is in the range of 90 to 210 μm, within which the surface area is large and thus suitable for coping with large current discharge and, also, it is easy to uniformly mix the negative electrode material with an electrolytic solution and a gelling agent, and handleability at the time of assembling a battery as well is favorable.

An aqueous solution containing an alkali metal hydroxide is used for the electrolytic solution 16. Examples of the alkali metal hydroxide include potassium hydroxide, sodium hydroxide, lithium hydroxide, ammonium hydroxide, and the like, and potassium hydroxide is more preferable. In order to suppress self-dissolution of zinc alloy, a zinc compound such as zinc oxide or zinc hydroxide may be added to the electrolytic solution. As described above, the electrolytic solution 16 may be present in the form of a positive electrode mixture and/or a negative electrode mixture by being mixed with the positive electrode 12 and/or the negative electrode 14.

In order to prevent the electrolytic solution from leaking, the electrolytic solution may be gelated. As a gelling agent, it is desirable to use a polymer that absorbs the solvent of the electrolytic solution and swells, and polymers such as polyethylene oxide, polyvinyl alcohol, and polyacrylamide as well as starch are usable.

EXAMPLES

Examples for producing the zinc secondary battery of the present invention will now be presented below.

Example 1

Preparation of Inorganic Solid Electrolyte Body by Hydrothermal Solidification

A mixed aqueous solution containing $Mg(NO_3)_2$ and $Al(NO_3)_3$ at a Mg/Al molar ratio of 3/1 was prepared. This mixed aqueous solution was added to an aqueous $Na_2CO_3$ solution dropwise to give precipitates. At this time, a sodium hydroxide solution was added to control the pH of the solution to a constant level of about 10. The resulting precipitates were filtered, washed, and dried to give layered double hydroxide powder having an average primary particle diameter of 0.5 µm or less and an average secondary particle diameter of 5 µm or less. This layered double hydroxide powder was pressed by a uniaxial pressing method to give a plate-shaped green compact. Pure water and the plate-shaped green compact were placed in a pressure vessel and heated at 200° C. for 4 hours to give a plate-shaped inorganic solid electrolyte body. The resulting inorganic solid electrolyte body had a relative density of 95% as measured by the Archimedes method.

Example 2

Preparation of Nickel-Zinc Secondary Battery

Figure 2:
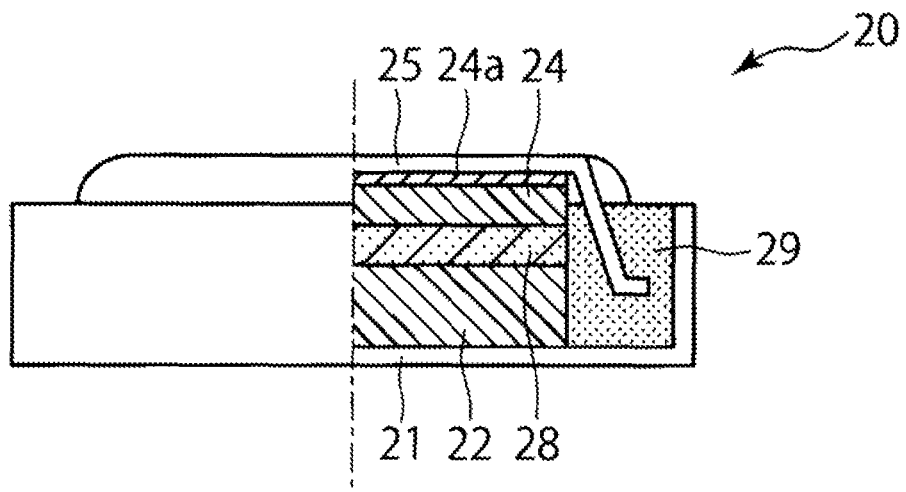
FIG. 2 is a schematic cross-sectional diagram showing the nickel-zinc secondary battery prepared in Example 2.

The inorganic solid electrolyte body prepared in Example 1 is used to prepare a coin cell-type nickel-zinc secondary battery configured as shown in FIG. 2 according to the procedure presented below. A nickel-zinc secondary battery 20 shown in FIG. 2 has a battery can 21 that accommodates a positive electrode mixture 22 containing beta nickel oxyhydroxide and an electrolytic solution, an negative electrode mixture 24 containing zinc as a negative electrode active material and an electrolytic solution, and a separator 28 that is the inorganic solid electrolyte body prepared in Example 1.

(1) Preparation of Positive Electrode Mixture

Nickel sulfate is dissolved in water to prepare an aqueous nickel salt solution having a specific concentration. The aqueous nickel salt solution and an aqueous sodium hydroxide solution are mixed to form insoluble nickel hydroxide. The nickel hydroxide is washed with water to remove an unnecessary by-product salt, and further dried to give beta nickel hydroxide. The resulting beta nickel hydroxide is subjected to a chemical oxidation method in which hypochlorous acid is used, to give beta nickel oxyhydroxide.

Manganese dioxide powder was added to and mixed with the beta nickel oxyhydroxide powder to give mixed powder. 5.4 parts by mass of graphite powder as an electrically conductive material is added to 90 parts by mass of the mixed powder, followed by dry stirring for 10 minutes. 4.6 parts by mass of an aqueous potassium hydroxide solution having a concentration of 40% by mass as an electrolytic solution is added to the stirred mixed powder, and is mixed for 30 minutes to give mixed powder. This mixed powder is subjected to a compacting process and a crushing process to give a granular positive electrode mixture. This positive electrode mixture is pressure-molded into a disc shape to give positive electrode mixture pellets.

(2) Preparation of Negative Electrode Mixture

Zinc alloy powder with an average particle diameter of 90 to 210 µm containing 0.01% by mass of indium, 0.01% by mass of bismuth, and 0.003% by mass of aluminum is prepared. 0.3 parts by mass of polyacrylic acid as a gelling agent is added to 65 parts by mass of this zinc alloy powder, and is stirred for 5 minutes to give a uniform mixture. On the other hand, 0.0006 parts by mass of tetrabutylammonium hydroxide is added to 35 parts by mass of an aqueous potassium hydroxide solution having a concentration of 35% by mass in which 3.5% by mass of zinc oxide is dissolved, and is mixed and stirred for 10 minutes to attain sufficient dispersion. The previously obtained mixture of zinc alloy powder is gradually added to the resulting dispersion over 4 minutes and also stirred and mixed under a reduced pressure of 150 mmHg or less and, further, stirred for 5 minutes under a reduced pressure of 10 mmHg or less to give a uniform gelated negative electrode mixture.

(3) Preparation of Battery

The positive electrode mixture and the negative electrode mixture as obtained above is used to prepare a coin battery-type nickel-zinc secondary battery having the configuration shown in FIG. 2 according to the procedure presented below. The battery can 21 composed of nickel-plated iron so as to serve as an external positive electrode terminal of a battery is provided. The positive electrode mixture 22 is placed in the center of the bottom part inside the battery can 21 so as to be away from the inner wall of the battery can 21. The solid electrolyte plate obtained in Example 1 was placed on the positive electrode mixture 22 as a separator 28. The negative electrode mixture 24 is placed on the separator 28, on which a negative electrode current collector 24a is placed. A negative electrode terminal plate 25 as an external negative electrode terminal is provided on the negative electrode current collector 24a, and the space between the inner wall and the battery laminate inside the battery can 21 is sealed with a sealing material 29 composed of an insulating resin. In this manner, a coin battery-type nickel-zinc secondary battery is obtained.

Since the positive electrode mixture 22 and the negative electrode mixture 24 both contain potassium hydroxide as an electrolyte, a conductive path of hydroxide ions through the separator 28 composed of an inorganic solid electrolyte body having hydroxide ion conductivity is ensured. For more sureness, an aqueous potassium hydroxide solution may be added dropwise onto the positive electrode mixture 22, followed by placement of the solid electrolyte plate as the separator 28, onto which an aqueous potassium hydroxide solution may also be added dropwise, followed by placement of the negative electrode mixture 24. Furthermore, in order to more stably retain hydroxide ions on the separator 28, one surface or both surfaces of the separator 28 may be provided with a porous substrate, which may contain an aqueous potassium hydroxide solution.

What is claimed is:

1. A zinc secondary battery comprising:
   a positive electrode;
   a negative electrode containing zinc;
   an electrolytic solution in which the positive electrode and the negative electrode are immersed or with which the positive electrode and the negative electrode are in contact, wherein the electrolytic solution is an aqueous solution containing an alkali metal hydroxide; and
   a separator being placed between the positive electrode and the negative electrode and separating the positive electrode and the negative electrode from each other, wherein the separator comprises an inorganic solid electrolyte body having hydroxide ion conductivity, wherein the inorganic solid electrolyte body has a relative density of 90% or greater; and wherein the inorganic solid electrolyte body is composed of a layered double hydroxide having a basic composition represented by a general formula:

$$M^{2+}_{1-x}M^{3+}_{x}(OH)_2A^{n-}_{x/n}\cdot mH_2O$$

wherein $M^{2+}$ is at least one divalent cation, $M^{3+}$ is at least one trivalent cation, $A^{n-}$ is an anion having a valency of n, n is an integer of 1 or greater, x is 0.1 to 0.4, and m is any number greater than 0 that indicates the molar number or water.

2. The zinc secondary battery according to claim 1, wherein $M^{2+}$ is $Mg^{2+}$, $M^{3+}$ is $Al^{3+}$, and $A^{n-}$ is $CO_3^{2-}$.

3. The zinc secondary battery according to claim 1, wherein the inorganic solid electrolyte body is densified by a hydrothermal solidifying method.

4. The zinc secondary battery according to claim 1, wherein the inorganic solid electrolyte body is formed in a plate shape.

5. The zinc secondary battery according to claim 1, which is selected from the group consisting of a nickel-zinc secondary battery, a silver oxide-zinc secondary battery, a manganese oxide-zinc secondary battery, a zinc-air secondary battery, and other alkaline zinc secondary batteries.

6. The zinc secondary battery according to claim 1, which is a nickel-zinc secondary battery.

7. The zinc secondary battery according to claim 6, wherein the positive electrode comprises nickel oxyhydroxide.

8. The zinc secondary battery according to claim 7, wherein the alkali metal hydroxide is potassium hydroxide.

9. The zinc secondary battery according to claim 1, wherein the separator comprises two opposed surfaces and a porous substrate is positioned on one of the opposed surfaces or on both of the opposed surfaces of the separator.

10. The zinc secondary battery according to claim 1, wherein the separator is a discrete component from the electrolytic solution.

* * * * *